United States Patent Office 2,790,682
Patented Apr. 30, 1957

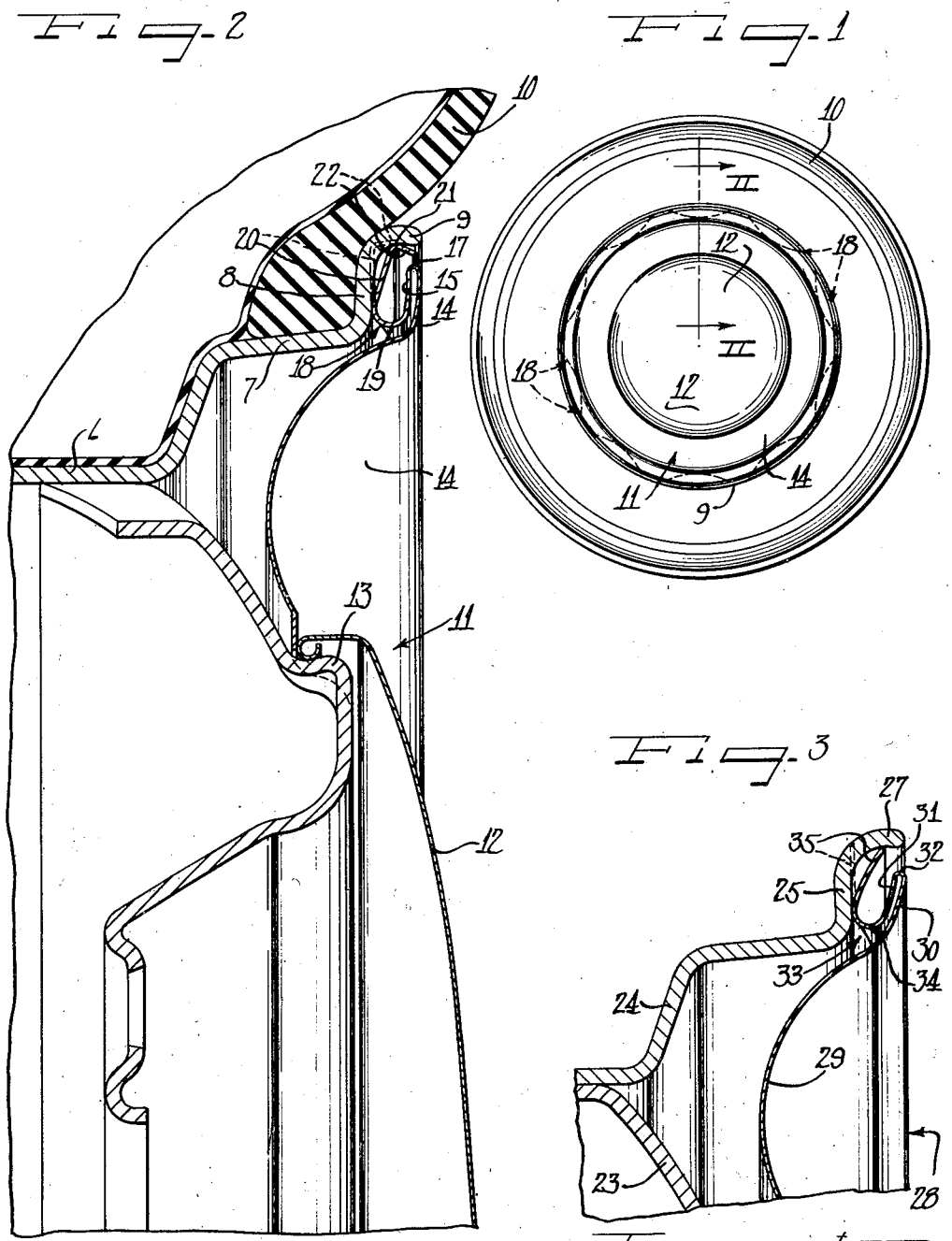

2,790,682

WHEEL COVER

George Albert Lyon, Detroit, Mich.

Application June 18, 1954, Serial No. 437,630

4 Claims. (Cl. 301—37)

This application is a continuation-in-part of my pending application Serial No. 139,892, filed January 21, 1950, now abandoned.

The present invention relates to improvements in wheel structures and more particularly concerns the protective and ornamental covering of the outer side of vehicle wheels.

An important object of the present invention is to provide an improved wheel structure in which a cover is disposed in ornamental and protective relation in the outer side of the wheel by attachment of the cover to the terminal flange of the tire rim.

Another object of the invention is to provide an improved means for attaching a vehicle wheel cover to the tire rim of the wheel.

A further object of the invention is to provide an improved cover for disposition at the outer side of a vehicle wheel having a multi-flange tire rim and having novel means at the outer margin of the cover for retaining engagement with the terminal flange of the tire rim.

Still another object of the invention is to provide improved retaining means for the outer margin of a wheel cover for retaining engagement of the terminal flange of the tire rim of a wheel to which the cover may be applied.

Yet another object is to provide an improved trim ring structure for vehicle wheels.

Other objects, features and advantages of the present invention will be readily apparent from the following detailed descripiton of certain preferred embodiments thereof taken in conjunction with the accompanying drawing in which:

Figure 1 is a side elevational view of a vehicle wheel having a cover structure embodying the features of the present invention;

Figure 2 is an enlarged radial sectional view taken substantially on the line II—II of Figure 1; and Figure 3 is a radial sectional view similar to Figure 2 but showing a modified construction.

The present invention relates to improvements in wheel structures of the kind currently in use in automobiles. Such wheel structures comprise a wheel body 5 and a tire rim 6, both of which may be made from suitable gauge sheet metal stamped or rolled or pressed to form. The wheel body is attached to the base of the tire rim in any suitable fashion. The tire rim includes a multi-flange, drop center construction comprising an intermediate flange 7 and a terminal flange 8 having an outturned or generally axially outwardly extending portion 9. The angular cross-section of the tire rim is designed to accommodate a pneumatic tire and tube assembly 10.

The outer side of the wheel is protectively and ornamentally covered by a wheel cover assembly 11 which may be of the full disk type arranged to substantially cover the entire outer side of the wheel including the wheel body 5 and substantially all of the tire rim 6. In the present instance, however, the cover assembly comprises a hub cap 12 held on the wheel body by means such as retaining bumps 13, and a trim ring 14 which may, as shown, extend substantially radially outwardly from underlying relation to the hub cap. The outside diameter of the trim ring 14 is preferably slightly less than the inside diameter of the tip or extremity of the outer portion 9 of the tire rim terminal flange so that in assembly the outer edge of the ring will lie in slightly spaced relation to the terminal flange extremity.

For retaining the cover ring 14 on the wheel, its outer marginal portion is equipped with novel retaining means for retaining it for cooperation with the terminal flange 8 and more particularly the outer portion 9 of the terminal flange. To this end, the outer marginal portion of the trim ring 14 is provided with an underturned flange 15 extending radially inwardly substantially parallel thereto and joining the same on a short radius reinforcing rib 17 projecting radially outwardly and providing the edge of the cover. Extending from the inner end of the underturned flange 15, is a retaining clip or finger 18 including a loop like juncture base 19 connecting the same to the underturned flange 15, and a clip body 20 extending radially outwardly in spaced relation to the underturned flange 15. The tip portion of the clip body 20 extends radially outwardly to a diameter which is slightly greater than the interior diameter of the outer portion 9 of the terminal flange and more particularly a generally radially inwardly opening groove 21 in said terminal flange portion. By preference the outer terminal end of the clip body 20 is formed with an axially outwardly turned terminal flange 22.

In the normal condition of the cover prior to assembly thereof with the wheel, the retaining clip 18 is in unstressed, undeflected condition wherein the body portion 20 of the clip extends substantially straight radially outwardly and is substantially flat and with the terminal flange portion 22 of the clip extending generally axially outwardly right angularly thereto.

In applying the cover 11 to the wheel, the cover is generally centered with respect to the wheel and with the retaining finger 18 or more particularly the outer portion of the retaining finger and body 20 resting against the tip of the terminal flange portion 9. Axial inward pressure against the cover causes the finger body 20 to flex axially outwardly and cam inwardly along the terminal flange tip until the finger terminal portion 22 snaps in behind the terminal flange tip into the groove 21. As a result, the finger body is deflected axially outwardly from the dash line normal position shown in Figure 2 to the full line position and the arcuate connecting loop base portion 19 of the clip is placed under radially inward stress so that the resilient reaction of the clip to the stressed retaining engagement condition thereof causes the shoulder at the axially inner side of the connecting loop 19 to be pressed toward and against the inner portion 8 of the terminal flange, and the generally axially extending tip 22 of the clip cooperating with the stressed clip body and base loop strongly resists axially outward displacement of the cover. At the same time, the cover ring body is retained by the clip in a generally axially floating condition which is highly advantageous in resisting damage to the cover from curbing stresses or impacts or the like. Moreover, the clip 18 retains the margin of the cover in spaced relation to the tire rim terminal flange and therefore permits ready air circulation thereby as may be desirable for air circulating through the usual wheel openings for cooling the brake drum.

Removal of the cover ring 14 can be readily accomplished by inserting a pry-off tool into the gap between the outer edge of the cover at the reinforcing juncture rib 17 and the adjacent edge of the terminal flange portion 9 and applying pry-off leverage to the margin of the cover.

In practice as many of the retaining clips 18 may be provided on the cover as desired. For example, 8 or 10 of the retaining fingers or clips 18 may be provided in groups or symmetrically about the periphery of the cover, as indicated in dash outline in Figure 1. It will also be observed that the clip bodies 20 and the base portions 19 of the clips flare to substantially greater width at juncture with the underturned flange 15, so that the clips are of progressively greater resilience from the extremity portions of the clips to the juncture with the cover marginal flange.

In some instances the tire rim terminal flange outer portion does not have a radially inwardly opening groove or is not sufficiently grooved to permit the efficient use of retaining fingers or clips 18 and for such applications, the form of Figure 3 is provided. In this form the wheel comprises a wheel body 23 carrying a multi-flange tire rim 24 having a terminal flange 25 formed with a radially outwardly extending generally axially disposed outer or terminal portion 27. To this wheel is applied a cover 28 which may have any desirable inner structure and including in the body thereof an intermediate annular concave portion 29 emerging with a radially outer or marginal portion 30. The marginal portion 30 has an underturned marginal flange 31 joined thereto on a reinforcing rib radially outwardly projecting juncture 32. From the underturned flange 31 projects a series of retaining clips 33 each of which includes a loop base juncture portion 34 and a body finger portion 35. The finger portion 35 normally projects radially substantially straight outwardly as indicated in dash outline and when the cover is applied to the wheel the tip of the finger 35 enters into retaining wedging endwise gripping engagement with the inner side of the terminal flange portion 27, with the finger portion 35 stressed into substantially the full outline position shown wherein the finger is bowed inwardly and the juncture loop portion 34 is also placed under radially inward stress and the finger thus tends to draw the margin of the cover axially inwardly until the shoulder at the axially inner side of the juncture loop 34 of the retaining finger or clip engages against the inner portion 25 of the terminal flange, thus retaining the cover in radially and axially floating resilient condition with the edge 32 spaced from the terminal flange 27.

The cover 28, similarly as the cover member 14, may be pried free from the wheel by applying pry-off force to the edge 32 thereof by means of a pry-off tool inserted in the gap between the edge 32 and the terminal flange portion 27 and levered against the margin of the cover. Reapplication of the cover 28 is, of course, easily effected by simply generally centering the same on the wheel and pressing axially inwardly on the cover until the retaining clips 33 effect retaining engagement with the terminal flange of the tire rim.

It will be understood that modifications and variations may be effected without departing from the scope of the novel concepts of the present invention.

I claim as my invention:

1. In a wheel structure including a multi-flange tire rim having a terminal flange, a cover member for the outer side of the wheel including a marginal underturned flange having axially inwardly and radially outwardly extending retaining spring finger means including a retaining finger normally extending substantially straight radially outwardly for engagement with the inner side of the axially outwardly projecting portion of the tire rim terminal flange and being maintained in assembly with said terminal flange portion in a radially inwardly stressed and generally axially outwardly deflected condition to restrain axially outward displacement of the cover, said retaining finger comprising an elongated body and a return bent base portion joining the underturned flange and being of progressively greater width from the outer portion of the finger body to juncture with the flange so as to afford progressively greater resilience in the finger from the engagement end thereof to said juncture.

2. In a cover for disposition at the outer side of a vehicle wheel, a cover body having a marginal portion adapted to be disposed at the outer side of a tire rim of a wheel and having an underturned marginal flange including retaining clip means comprising a generally straight radially outwardly extending retaining finger normally projecting to a greater diameter than the inside diameter of a tire rim flange to which it is to be applied, said finger being substantially free from axial deflection, the finger comprising an elongated resilient body and having a resilient base portion connecting the same to said underturned flange, said finger body and finger base being of progressively increasing width from the outer end portion thereof to juncture with the marginal flange so as to afford substantially increasing resilience in the finger and base progressively toward said juncture whereby to be deflectable into an angular relation to the normal radially outward position of the finger upon application of the cover to a wheel and engagement of the finger in retaining cooperation with a tire rim flange on the wheel.

3. In a wheel structure including a wheel body and a multi-flange tire rim having a terminal flange including a generally axially outwardly extending portion having a radially inwardly facing surface which is substantially free of groove formation, a cover for the outer side of the wheel including a marginal portion having an underturned flange, said underturned flange having a series of retaining fingers including return bent connecting loop portions flaring toward a substantially greater width at the radially inner margin of the flange and tapering toward a narrower width and an elongated body portion extending radially outwardly in spaced relation to the underturned flange and normally extending substantially straight radially outwardly but engaging endwise under stressed inwardly bowed condition against the inner face of the outer portion of the terminal flange and retaining the inner side of the juncture loop portion of the clips in seating engagement against the inner portion of the terminal flange.

4. In a wheel structure including a wheel body and a tire rim having a terminal flange provided with radially and axially extending portions, a hub cap for disposition over the wheel body, and a trim ring for disposition between the wheel body and the tire rim and substantially overlying the tire rim and including a marginal underturned flange having axially inwardly and radially outwardly extending retaining spring finger means including a retaining finger normally extending substantially straight radially outwardly for engagement with the inner side of the axially outwardly projecting portion of the tire rim terminal flange and being maintained in assembly with said terminal flange portion in a radially inwardly stressed and generally axially outwardly deflected condition to restrain axially outward displacement of the trim ring, said retaining finger comprising an elongated body and a return bent base portion joining the underturned flange and being of progressively greater width from the outer portion of the finger body to juncture with the flange so as to afford progressively greater resilience in the finger from the engagement end thereof to said juncture.

References Cited in the file of this patent
UNITED STATES PATENTS

| | | |
|---|---|---|
| 2,404,389 | Lyon | July 23, 1946 |
| 2,404,390 | Lyon | July 23, 1946 |